Patented Feb. 12, 1924.

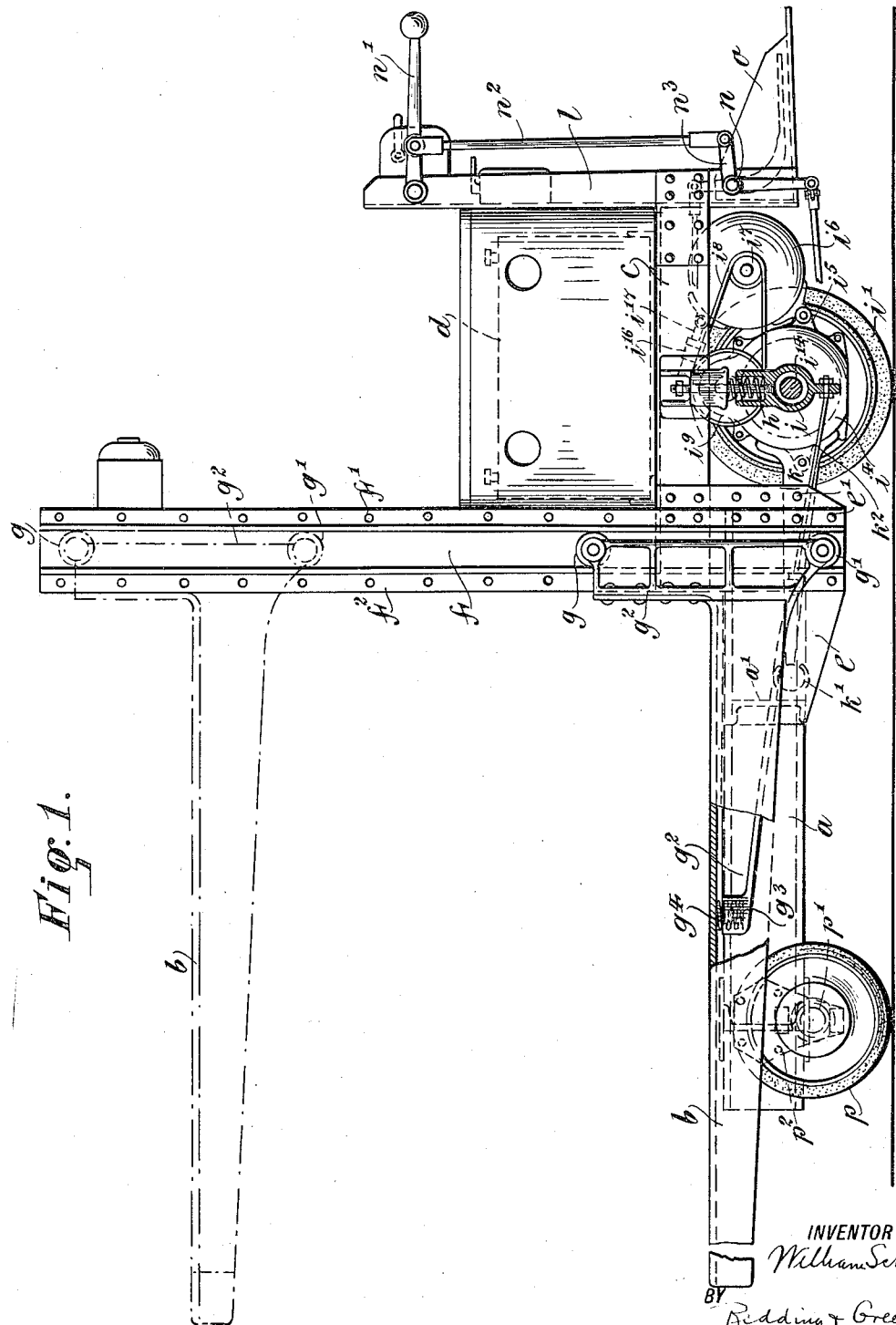

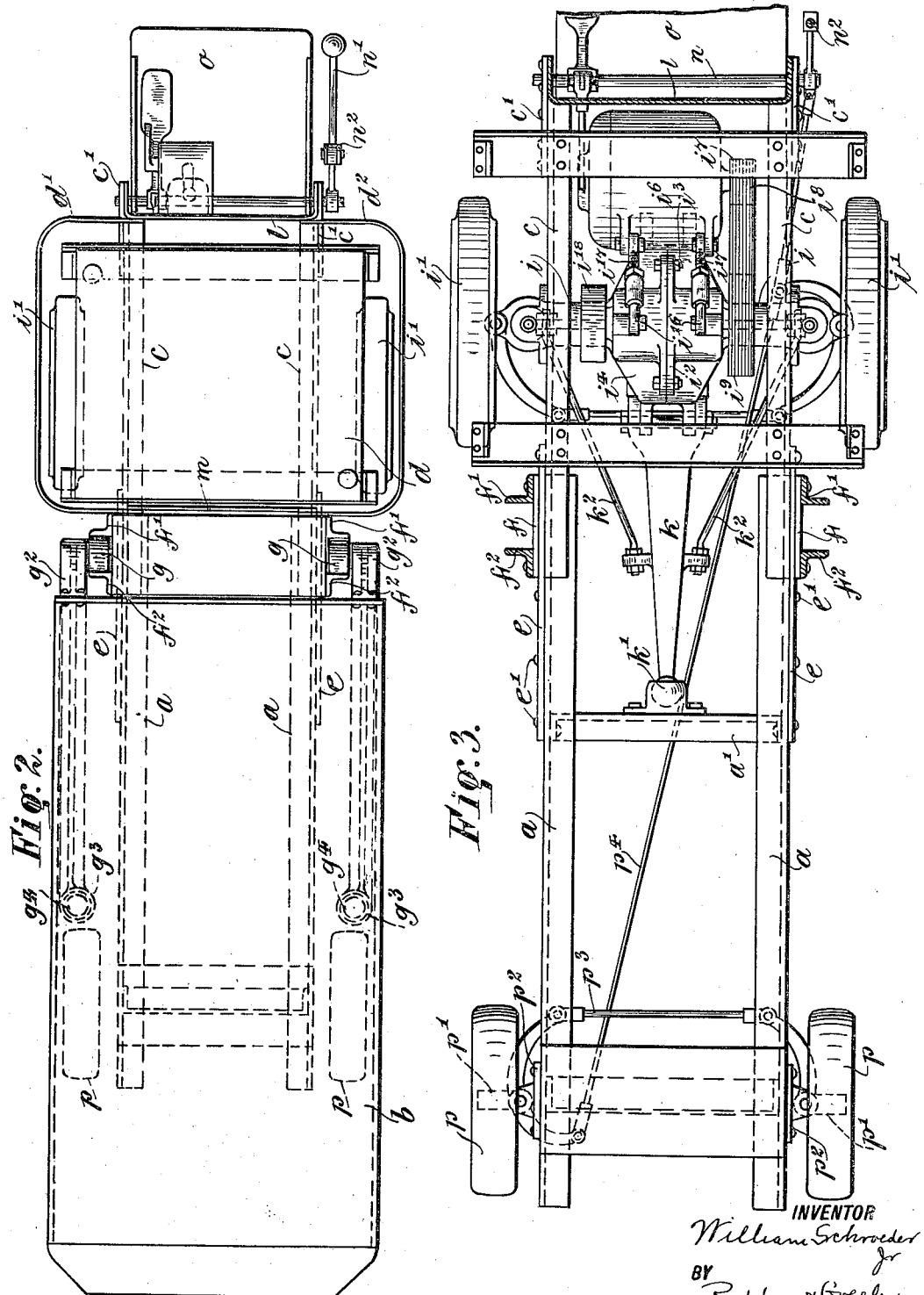

1,483,600

UNITED STATES PATENT OFFICE.

WILLIAM SCHROEDER, JR., OF BROOKLYN, NEW YORK.

INDUSTRIAL TRUCK.

Application filed September 17, 1921. Serial No. 501,287.

*To all whom it may concern:*

Be it known that I, WILLIAM SCHROEDER, Jr., a citizen of the United States, residing at 312 Lincoln Road, in the borough of Brooklyn, of the city of New York, in the State of New York, have invented certain new and useful Improvements in Industrial Trucks, of which the following is a specification, reference being had to the accompanying drawings, forming a part hereof.

This invention relates to industrial trucks and is concerned particularly with features of construction which, for the most part, will find especial application to trucks of the elevating platform type. Some of the improvements, however, are equally applicable to industrial trucks having stationary platforms.

One of the principal objects of the invention is to provide an improved supporting and guiding frame for the elevating platform and an improved trackway therefor whereby maximum elevation for a trackway of given height may be secured for the platform and, at the same time, a strong and free running carriage is provided. Heretofore, supporting carriages for the elevating platform have been open to certain objections either from the manufacturer's standpoint as regarded cost and ease in assembling and dis-assembling or from the user's standpoint as regarded stresses. The improved carriage is of exceedingly simple construction consisting, generally speaking, of two rolls on each side adapted to run in outside channel-ways extending upwardly from the side frames of the chassis.

Other features of the frame are concerned with a novel form of dash and support for the operator's step.

These and other objects and advantages of the invention will appear at greater length hereinafter in connection with the detailed description of the embodiment of the invention shown in the drawings, wherein—

Figure 1 is a view in side elevation of an improved truck embodying the improvements, one of the drive wheels being removed in the interest of clearness.

Figure 2 is a view in plan of the truck shown in Figure 1.

Figure 3 is a detail view in plan on a somewhat larger scale than Figure 2 but showing the stripped chassis.

The chassis of the improved truck includes longitudinally extending side frame members including at each side a rear member $a$ to support the elevating platform $b$ and a front member $c$ to support the battery box the hood of which is indicated at $d$. The members $a$ and $c$ while lying in different horizontal planes in accordance with the best practice, are in the same longitudinal plane and united into a unitary structure by gusset plates $e$ and rivets $e'$ or the like. The advantage of this construction is that the truck is of predetermined length throughout, ample wheel clearance is given and adequate support for both the platform $b$ and the battery box $d$ afforded. To the outer sides of the rear frame members $a$ is secured a vertical plate $f$ having riveted to its outer face opposed angle pieces $f'$, $f^2$ the flanges of which form a trackway. It has been found that the angle pieces $f'$, $f^2$, when riveted to the vertical plate $f$ afford, for a given weight, a degree of strength which cannot be secured in a channel constructed in any other way. In the metal worker's art it is recognized that the flanges of a channel piece have not sufficient strength nor the proper form to permit their practical use as a trackway for the purpose required in the present device. In the interest of inexpensive manufacture and assembly, lightness of weight and effective resistance to the stresses imposed thereon by the cantilever suspension of the platform the improved channel is a radical departure and improvement in the art. In each of the trackways thus formed are disposed spaced rollers $g$, $g'$ carrying a cast frame $g^2$ on which is supported the elevating platform $b$. The rollers $g$, $g'$ run in the vertical trackway between the angle pieces $f'$, $f^2$ and are spaced apart a sufficient distance to provide a firm cantilever anti-friction support for the platform $b$. For a given height of plate $f$ the platform $b$ may have a maximum travel with the improved arrangement of supporting rollers therefor.

The parts described, it will be observed, are simple and inexpensive to manufacture, easy to assemble and adjust, and thoroughly efficient in operation providing flexibility in the inter-relation of frame and drive, with yet sufficient rigidity and stiffness to resist stresses which approach a critical point.

At the front end of the frame certain details of construction have been worked out which are of such importance as to warrant comment since they satisfy better practise than that heretofore employed. For instance, the dashplate of the vehicle is formed as a channel member $l$ riveted to gusset plates $c'$ on the front side members $c$. This dashplate is independent of the side walls $d'$, $d^2$ of the battery box which is so formed as to enclose the box and be secured to the rear face of the dashplate $l$. The rear wall of the battery bonnet may be formed with a plain panel $m$ which extends directly between the vertical plates $f$ and may be secured to the free edges of the side walls $d'$, $d^2$ of the bonnet. Extending through the flanges of the channeled dashplate $l$ is a shaft $n$ on which is hinged the operator's step $o$. The shaft $n$ in the illustrated embodiment may support one element of the steering mechanism leading down from the operator's handle $n'$ through linkage $n^2$ to the bar $n^3$. This means of supporting the operator's step $o$ from one of the supporting elements for the control mechanism is novel and obviously simplifies the vehicle.

The idler wheels $p$ are mounted on stub axles $p'$ which are pivoted on knuckle plates $p^2$ adapted to be secured to the outer sides of the frame members $a$. The wheels $p$ are interconnected usually through suitable tie rods $p^3$ and links $p^4$ with the drive wheels $i'$ for four-wheel steering. By mounting the stub axles $p'$ for the wheels $p$ on brackets $p^2$ as described, it is evident that these brackets may be applied to side frame members which are spaced varying distances apart thereby making it unnecessary to make up spacing axles of predetermined length for chassis of different widths.

From the description given herein it will be apparent that the entire vehicle is characterized by simplicity, cheapness of manufacture, ease of assembly, ruggedness and efficiency. Such adjustments as are necessary are simple and accessible. The supporting elements for the elevating platform insure easy operation, maximum lift and strength. All of the parts are so inter-related as to give a clean chassis with straight lines. Changes in details of construction may be made without departing from the spirit of the invention provided such modifications fall within the scope of the appended claims.

I claim as my invention:

1. In an industrial truck, in combination with the chassis, having side frame members, a platform supporting frame formed of commercial rolled stock of standard cross section and comprising vertical plates secured to said side frame members and angle pieces secured to said plates in parallelism and in spaced relationship to form trackways on the outer faces thereof.

2. In an industrial truck, in combination with the chassis, having side frame members, a platform supporting frame formed of commercial rolled stock of standard cross section and comprising vertical plates secured to said side frame members, angle pieces secured to said plates in parallelism and in spaced relationship to form trackways on the outer faces thereof, an elevating platform, and a traveling carriage supporting said platform and having spaced rollers adapted to run in the respective trackways.

3. In an industrial truck, in combination with the chassis, having side frame members, a platform supporting frame formed of commercial rolled stock of standard cross section and comprising vertical plates secured to said side frame members, angle pieces secured to said plates in parallelism and in spaced relationship to form trackways on the outer faces thereof, an elevating platform, and a traveling carriage carrying said platform and supporting it by a cantilever suspension formed by means of two spaced rollers at each side thereof adapted to rest in the respective trackways.

This specification signed this 16th day of September, A. D. 1921.

WILLIAM SCHROEDER, Jr.